(12) United States Patent
Tanaka

(10) Patent No.: US 6,431,267 B1
(45) Date of Patent: Aug. 13, 2002

(54) AIR CONDITIONING UNIT AND VEHICULAR AIR CONDITIONER

(75) Inventor: Yasunari Tanaka, Nishi-kasugai-gun (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/573,170

(22) Filed: May 19, 2000

(30) Foreign Application Priority Data

May 20, 1999 (JP) .......................................... 11-140713

(51) Int. Cl.[7] .............................................. B60H 1/00
(52) U.S. Cl. ........................... 165/204; 165/42; 62/186; 454/69
(58) Field of Search ........................... 165/42, 43, 201, 165/202, 203, 204; 62/186; 454/75, 69; 236/13

(56) References Cited

U.S. PATENT DOCUMENTS

| | | | | |
|---|---|---|---|---|
| 4,383,642 A | * | 5/1983 | Sumikawa et al. | 165/42 X |
| 4,574,873 A | * | 3/1986 | Kawahira et al. | 165/42 |
| 4,828,018 A | * | 5/1989 | Hoffman | 236/13 X |
| 5,086,628 A | * | 2/1992 | Hashimoto | 236/13 X |
| 5,195,574 A | * | 3/1993 | Tanaka et al. | 454/75 X |
| 5,701,949 A | * | 12/1997 | Yamaguchi et al. | 165/42 |

FOREIGN PATENT DOCUMENTS

| | | |
|---|---|---|
| JP | 61-177907 | 11/1986 |
| JP | 10-181336 | 7/1998 |
| JP | 11-011139 | 1/1999 |

* cited by examiner

*Primary Examiner*—Ljiljana Ciric
(74) *Attorney, Agent, or Firm*—Oblon, Spivak, McClelland, Maier & Neustadt, P.C.

(57) ABSTRACT

An air conditioning unit including a box having an intake switching damper for selectively opening an outside air inlet and an inside air inlet to receive introduced air. The air conditioning unit further including a blower unit configured to draw in the introduced air and blow the introduced air to a downstream side, and an air regulating unit. The air regulating unit has a unit case with an evaporator configured to exchange heat between the introduced air and a refrigerant, a heater core configured to exchange heat between the introduced air and a warm fluid, and an air mix damper for adjusting a flow quantity of the introduced air that passes through the heater core. The unit case has a defroster damper for a defroster air outlet configured to discharge toward a glass surface a two-layer flow of air-conditioned air comprising a warm layer and a cold layer.

10 Claims, 4 Drawing Sheets

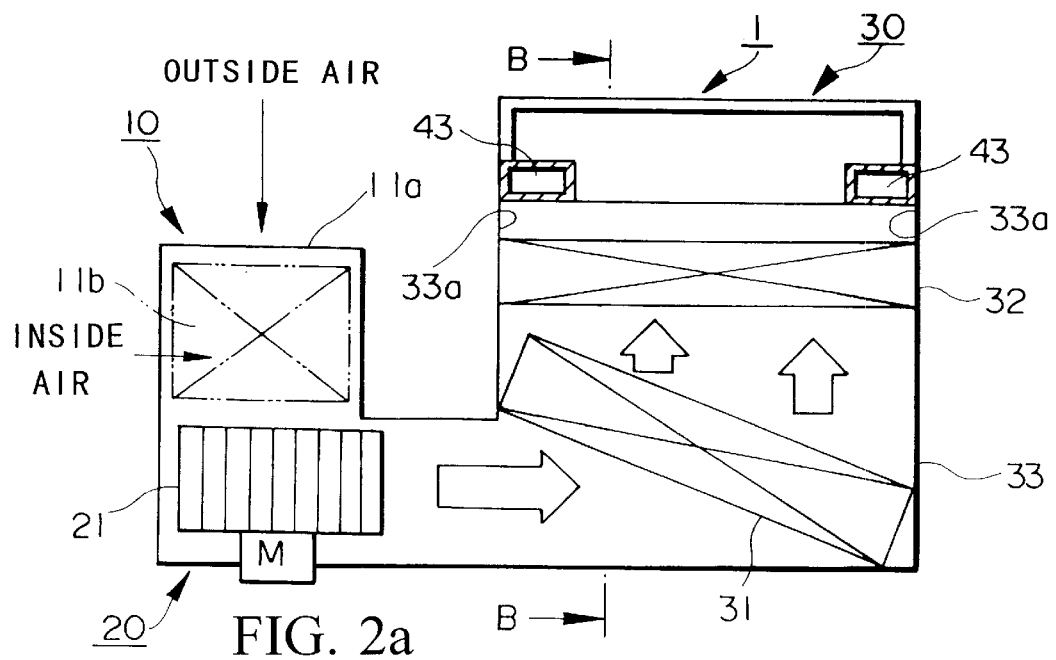
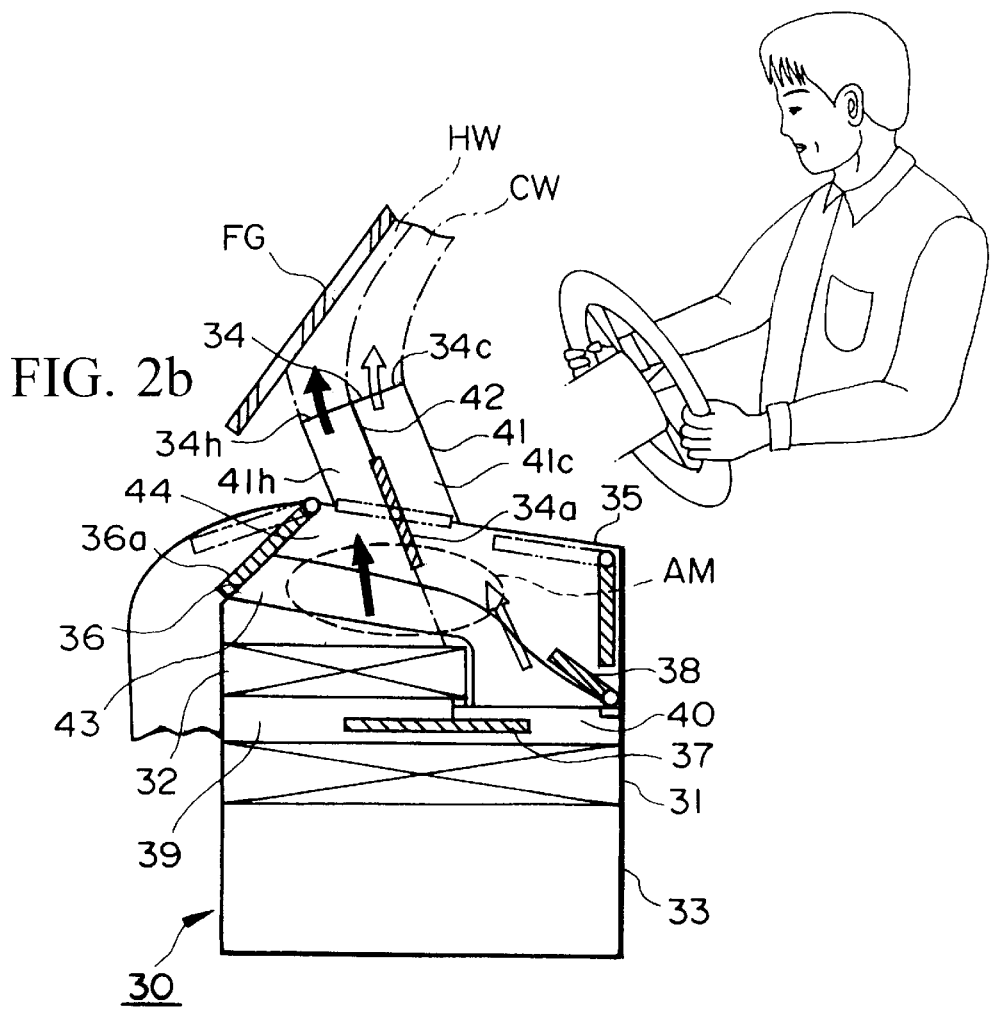

AIR CONDITIONING UNIT AND VEHICULAR AIR CONDITIONER

BACKGROUND OF THE INVENTION

1. Field of the Invention

The present invention relates to an air conditioning unit and a vehicular air conditioner installed in a vehicle such as an automobile, for performing air conditioning such as cooling and heating within the vehicle interior. In particular, the invention relates to technology for improving an air conditioning feeling at the time of a defroster blowing mode.

2. Description of the Related Art

Conventionally, the air conditioning unit installed in a vehicle such as an automobile executes an air conditioning operation such as cooling, heating, and dehumidifying to provide a comfortable environment to the passengers inside the vehicle interior. Moreover, the air conditioning unit is also provided with a function for blowing warmed air and dehumidified air (air-conditioned air) from an air outlet referred to as a defroster air outlet, directly onto the inner face of the windscreen (front glass) or the like in order to, for example, remove the frost on the windscreen before travelling during winter, or to remove the fog on the windscreen while travelling in the rain. This air conditioning operation mode is generally referred to as a "defroster blowing mode". In addition to this "defroster blowing mode", there are also the following blowing modes.

A "face blowing mode" mainly used at the time of cooling operation in summer, which blows cold wind toward the upper body of the occupant from a face air outlet. A "foot blowing mode" mainly used at the time of heating operation in winter, which blows warm wind toward the feet of the occupant from a foot air outlet. A "bi-level blowing mode" mainly used at the period during spring or autumn, which blows air-conditioned air from both the face air outlet and the foot air outlet. In this case, typically the wind blown from the face air outlet is made a lower temperature than that from the foot air outlet; "head cold and feet hot".

However, with the conventional defroster blowing mode, the defroster function is given preference. Hence, the warm wind side is strong so that the temperature of the blown air-conditioned air tends to increase. Therefore, warm wind of a relatively high temperature flows from the windscreen side toward the face and head of the occupant. This is undesirable from the point of view of air conditioning feeling.

In particular, with a vehicular air conditioner, since "head cold and feet hot" is the basis, an air conditioning unit and a vehicular air conditioner is desired where a defroster function where performance is improved by blowing a warm wind of a high temperature, is made compatible with air conditioning feeling which is improved by supplying cool air toward the head.

SUMMARY OF THE INVENTION

The present invention takes into consideration the above situation with the object of providing an air conditioning unit and a vehicular air conditioner which can improve both the defroster function and air conditioning feeling at the time of defroster operation mode.

The present invention adopts the following means in order to solve the above problems.

An air conditioning unit according to a first aspect of the invention comprises: an inside air/outside air box incorporating an inside air/outside air switching damper for opening an outside air inlet and an inside air inlet to selectively switch introduced air to one of inside air and outside air; a blower unit provided with a blower fan for drawing in the introduced air and blowing this to a downstream side; and an air regulating section unit with an evaporator for exchanging heat between the introduced air passing therethrough and a refrigerant, a heater core for exchanging heat between the introduced air passing therethrough and warm water, and an air mix damper for adjusting a flow quantity of the introduced air which passes through the heater core, provided inside a unit case having a plurality of air outlets opening upward which are each provided with a damper, and with the heater core arranged above the evaporator; wherein the construction is such that a defroster air outlet for blowing toward a glass face, blows a two-layer flow of air-conditioned air comprising a warm wind and a cold wind.

With such an air conditioning unit, air-conditioned air in two layer streams comprising a warm wind and a cold wind can be blown from the defroster air outlet. Therefore, the defroster function is improved by the high temperature warm wind, and appropriate temperature conditioned air of a mixture of warm wind after defrosting and cold wind, can be supplied to the occupants and the vehicle interior.

A vehicular air conditioner according to an other aspect of the invention comprises: an air conditioning unit comprising: an inside air/outside air box incorporating an inside air/outside air switching damper for opening an outside air inlet and an inside air inlet to selectively switch introduced air to one of inside air and outside air; a blower unit provided with a blower fan for drawing in the introduced air and blowing this to a downstream side; and an air regulating section unit with an evaporator for exchanging heat between the introduced air passing therethrough and a refrigerant, a heater core for exchanging heat between the introduced air passing therethrough and warm water, and an air mix damper for adjusting a flow quantity of the introduced air which passes through the heater core, provided inside a unit case having a plurality of air outlets opening upward which are each provided with a damper, and with the heater core arranged above the evaporator; where a defroster air outlet for blowing toward a glass face, blows a two-layer flow of air-conditioned air comprising a warm wind and a cold wind; a refrigerant system comprising; a compressor for compressing a gas refrigerant, a condenser for exchanging heat of the high pressure gas refrigerant with outside air to condense the gas refrigerant to liquid refrigerant, and an expansion valve for changing the high temperature and high pressure liquid refrigerant into a low temperature and low pressure liquid refrigerant, for supplying low temperature and low pressure liquid refrigerant to the evaporator, a heat source system for introducing engine cooling water to the heater core, and a control section for controlling operation of the air conditioning unit, the refrigerant system, and the heat source system.

With such a vehicular air conditioner, air-conditioned air in two layer streams comprising a warm wind and a cold wind can be blown from the defroster air outlet. As a result, the defroster function is improved by the high temperature warm wind, and appropriate temperature conditioned air of a mixture of warm wind after defrosting and cold wind, can be supplied to the occupants and the vehicle interior. Therefore, the defroster function is made compatible with air conditioning feeling, giving an apparatus with high marketability.

BRIEF DESCRIPTION OF THE DRAWINGS

FIG. 2a shows a block diagram as seen from the-vehicle interior side of a second embodiment of an air conditioning unit according to the present invention.

FIG. 2b shows a sectional view on B—B of FIG. 2a.

DESCRIPTION OF THE PREFERRED EMBODIMENTS

Hereunder is a description of embodiments of an air conditioning unit and a vehicle air conditioner according to the present invention, based on the drawings.

Figure 4:
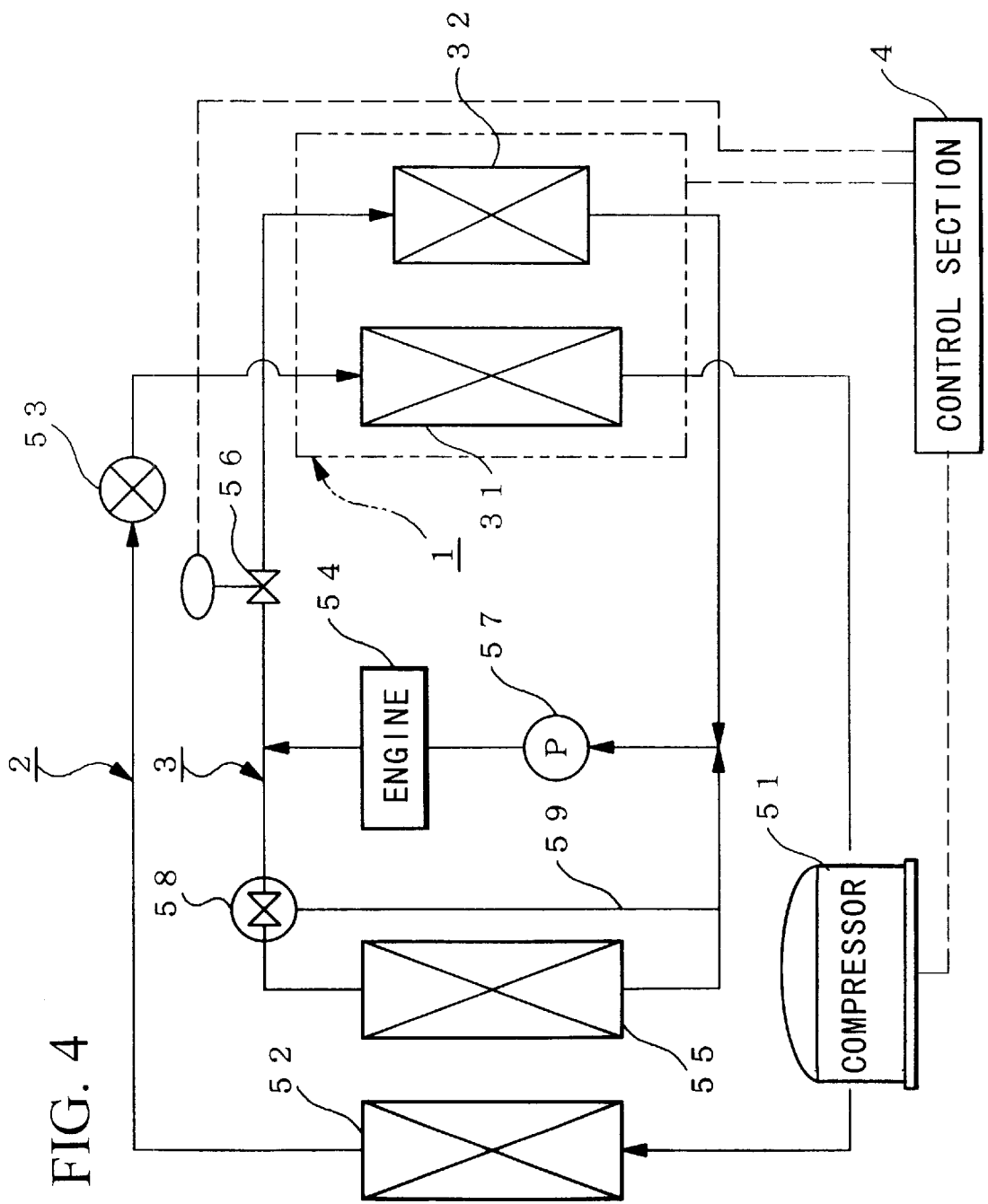
FIG. 4 is a system diagram showing the construction of a vehicular air conditioner.

The vehicle air conditioner according to the present invention, as shown by the system flow diagram of FIG. 4, generally comprises; an air conditioning unit 1 for performing air conditioning such as cooling and heating, a refrigerant system 2 for supplying refrigerant to the air conditioning unit 1 at the time of a cooling operation, a heat source system 3 for supplying engine cooling water as a heat source, to the air conditioning unit 1 at the time of a heating operation, and a control section 4 for controlling the operation of the overall equipment.

Figure 3:
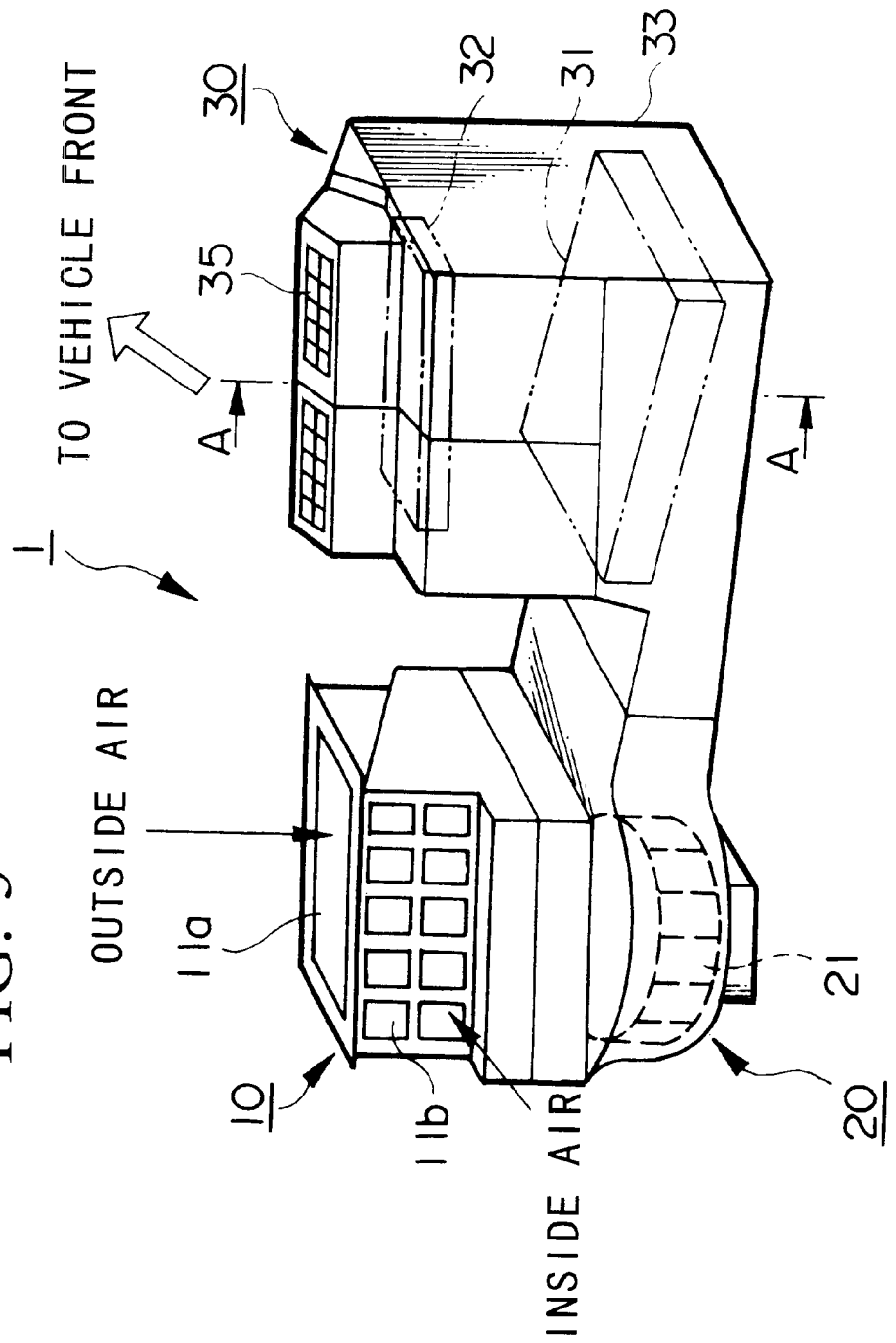
FIG. 3 is a perspective view of the air conditioning unit as seen from the vehicle interior side.

The air conditioning unit 1, as shown by the perspective view of FIG. 3, comprises an inside air/outside air box 10, a blower unit 20, and an air regulating section unit 30 which are connected integrally together. The air conditioning unit 1, in the case of a typical sedan type passenger car, is installed on the passenger seat side on the left side (or the right side) as seen from the vehicle interior, and positioned beneath the dashboard behind the engine room. Hereunder is a description of the air conditioning unit 1 in air flow direction sequence.

At first, the inside air/outside air box 10 is the part having the function of selectively switching the air introduced to the air conditioning unit 1 to either one of the outside air (air outside the vehicle) and the inside air (air inside the vehicle interior). Here an outside air introducing inlet 11a communicating with the vehicle exterior, and an inside air introducing inlet 11b communicating with the vehicle interior are provided. One of the two air introducing inlets 11a and 11b is closed by an inside/outside air switching damper (not shown in the figure), to select the introduced air, The blower unit 20 is provided connected downstream of the inside air/outside air box 10, and has the function of selectively drawing in external air or internal air by operation of a blower fan 21, and blowing this to the air regulating section unit 30 (to be described later). The blower fan 21 has an electric motor as the drive source, and in general, the fan can be stopped and can be switched for several different air flow quantities. Here, in the case where air is introduced while the vehicle is travelling, then even if the blower fan 21 is stopped, the external air being the wind generated by travelling, can flow to the air regulating section unit 30.

Figure 1:
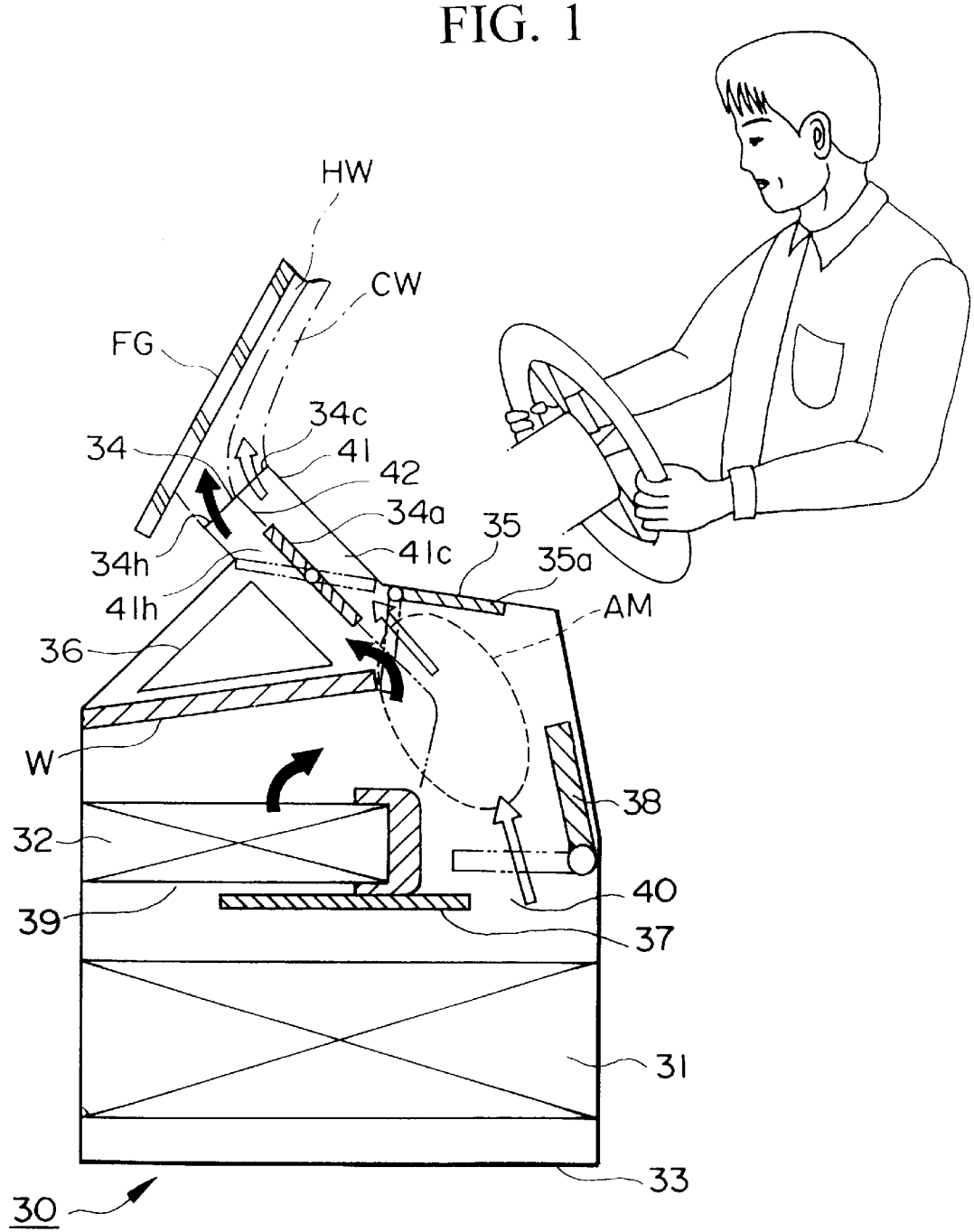
FIG. 1 shows a first embodiment of an air conditioning unit according to the present invention, being a sectional view on A—A of FIG. 3.

The air regulating section unit 30 has an air conditioning function for executing dehumidification or temperature control of the introduced air blown in from the blower unit 20. The air regulating section unit 30 is an integrated unit with an evaporator 31 serving as the cooling heat exchanger, and a heater core 32 serving as the heating heat exchanger housed inside a unit case 33. Hereunder is a description of the construction of a first embodiment shown in FIG. 1.

Opened in the unit case 33 is a defroster air outlet 34, a face air outlet 35, and a foot air outlet 36, which are respectively provided with a defroster damper 34a, a face damper 35a, and a foot damper (not shown). Further provided in the unit case 33 is an air mix damper 37 for adjusting the flow quantity of the introduced air which has passed through the heater core 32 to become warm air, and a sub damper 38 linked to the air mix damper 37, which is able to adjust the blow amount of the cold wind. Here the air mix damper 37 can also contribute to the blow amount adjustment of the cold wind.

The evaporator 31 is arranged so that the whole amount of the introduced air blown from the blower unit 20, first passes therethrough. The heater core 32 is arranged above the evaporator 31 so as to be on the downstream side thereof However the whole amount of the introduced air does not necessarily pass through the heater core 32. Consequently, the heater core 32 is arranged on one part of the cross-section of the unit case 33 to form a flow path, and at the installation face of the heater core 32, the introduced air is divided into a heating flow path 39 which passes through the heater core 32, and a non heating flow path 40 which does not pass therethrough.

As a result, the introduced air is divided by the open/close position of the air mix damper 37 which slides along the inlet face of the heater core 32, and the sub damper 38 which is arranged in approximately in the same plane of the heater core 32 in the non heating flow path 40, into introduced air which passes through the heater core 32 and introduced air which does not pass through the heater core 32.

The defroster air outlet 34, the face air outlet 35, and the foot air outlet 36 are all opened in the upper portion of the unit case 33 above the heater core 32. The respective air outlets are sequentially arranged from the front side of the vehicle to the interior side of the vehicle as the foot air outlet foot 36, the defroster air outlet 34, and the face air outlet 35. Here the foot air outlet 36 is opened in the side face of the unit case 33, and actually an air outlet (omitted from the figure) for blowing warm air to the feet of the passengers (occupants) inside the vehicle interior, is connected by a duct to the foot air outlet 36.

The defroster air outlet 34 is provided at the outlet of a defrost duct 41 which guides the air-conditioned air so as to blow out toward the inner face of the windscreen (front glass) FG. The defrost duct 41 may be formed integral with the unit case 33. Alternatively, this may be fitted as a separate duct. The inner portion of the outlet side of the defrost duct 41 is divided into two in the front and rear in the vehicle travelling direction by a divider 42 which extends in the vehicle widthwise direction. Of these, the defroster outlet on the windscreen FG side (front side) is referred to as the warm wind outlet 34h, while the defroster outlet on the vehicle interior side (rear side) is referred to as the cold wind outlet 34c. On the one hand, the warm wind outlet 34h guides the relatively high temperature conditioned air (warm wind) so as to be blown directly onto the windscreen FG, while on the other hand, the cold wind outlet 34c guides the relatively low temperature conditioned air (cold wind) so as to be blown along the inside (vehicle interior side) of the warm flow. Therefore a two-layer flow comprising the warm wind on the windscreen FG side and the cold wind on the vehicle interior side, is blown from the defroster air outlet 34. Here in FIG. 1, the black arrow shows warm wind while the white arrow shows cold wind, and the symbol HW denotes the warm wind (hot wind) layer, while CW denotes the cold wind layer.

Furthermore, at the defroster air outlet 34, for the defroster damper, rather than a swing type damper with an edge of the damper body supported, a rotatably supported damper 34*a* with the center or near center of the damper body rotatably supported is adopted and fitted. This rotatably supported damper 34*a* is arranged so that in a condition with the defroster air outlet 34 opened, the damper body divides the interior of the defrost duct 41 into front and rear. With the example shown in the figure, the damper body in the open condition forms a dividing wall together with the divider 42 approximately continuous therewith, so that a warm wind duct 41*h* for guiding warm wind to the warm wind outlet 34*h*, and a cold wind duct 41*c* for guiding cold wind to the cold wind outlet 34*c*, are formed inside the defrost duct 41.

The evaporator 31 arranged in the air regulating section unit 30, receives the supply of low temperature low pressure liquid refrigerant from the refrigerant system 2 (described later) at the time of a cooling operation, and exchanges heat between the introduced air blown from the blower unit 20 and the refrigerant. As a result, the introduced air gives up heat to the refrigerant to become cooled and dehumidified cold wind, and is then introduced to the heating flow path 39 or the non heating flow path 40.

The heater core 32 receives the supply of high temperature engine cooling water from the heat source system 3 (described later) at the time of a heating operation, and is a heat exchanger for heating the introduced air which has been blown in through the evaporator 31. The introduced air fed to the heater core 32 is flow quantity adjusted corresponding to the opening of the air mix damper 37.

Next is a description of the construction of the refrigerant system 2 based on FIG. 4. The refrigerant system 2 supplies low temperature, low pressure liquid refrigerant to the evaporator 31, and comprises a compressor 51, a condenser 52, and an expansion valve 53.

The compressor 51 compresses low temperature low pressure gas refrigerant which has absorbed heat from the vehicle interior at the evaporator 31 and evaporated, and discharges this as high temperature high pressure gas refrigerant to the condenser 52. In the case of an automotive air conditioner, the compressor 51 is driven by the engine 54 by way of a belt and clutch.

The condenser 52 is provided at the front of the engine room for cooling the high temperature high pressure gas refrigerant supplied from the compressor 51 with outside air, to condense and liquefy the gas refrigerant. The liquefied gas refrigerant is then sent to a receiver (omitted from the figure) and after separating the vapor from the liquid, the liquid is sent to the expansion valve 53 as a high temperature high pressure liquid refrigerant. At the expansion valve 53, the high temperature high pressure liquid refrigerant is reduced in pressure and expanded so as to give a low temperature low pressure liquid (mist) refrigerant, which is then supplied to the evaporator 31. Here the expansion valve 53 is typically provided at a proper location inside the air regulating section unit 30 together with the evaporator 31.

Next is a brief description of the construction of the heat source system 3 based on FIG. 4. The heat source system 3 supplies high temperature engine cooling water serving as a heat source to the heater core 32. This involves flow controlling by means of a water valve 56 so as to introduce a part of the engine cooling water which is circulated between the engine 54 and the radiator 55 to the air conditioner. Here reference numeral 57 in the figure denotes a cooling water circulation pump, 58 denotes a thermostat, while 59 denotes a bypass flow path.

Finally, the construction of the control section 4 will be briefly described. The control section 4 controls the operation of the air conditioning unit 1, the refrigerant system 2, and the heat source system 3, constituting the air conditioner. Normally the control section 4 has built in control circuits in an operating panel for performing various settings by the operator (passenger), and is installed in a central portion of the instrument panel. The control section 4 is able to perform operations such as, the switching operation for the inside air/outside air switching damper, the selective switching of the various operating modes by opening and closing the damper types provided in the air outlets or the like, the switching of the air flow quantity of the blower fan 21, and desired temperature setting operations.

With the vehicle air conditioner constructed in above manner, by operating the blower fan 21, the outside air or the inside air is introduced to the interior of the air conditioning unit 1 from the outside air introducing inlet 11*a* or the inside air introducing inlet 11*b* on the inside air/outside air box 10. This introduced air is fed to the downstream side air regulating section unit 30 by way of the blower unit 20. The introduced air flowing inside the air regulating section unit 30 passes through the evaporator 31. Here, at the time of cooling operation when low temperature, low pressure liquid refrigerant is supplied from the refrigerant system 2, the introduced air exchanges heat with the refrigerant and is cooled and dehumidified. The air then flows toward the downstream side heater core 32.

When the air mix damper 37 completely covers the heating flow path 39 leading to the heater core 32, then the full amount of the cooled and dehumidified introduced air passes though the non heating flow path 40, and cold wind is blown into the vehicle interior from the air outlets where the dampers are in the open condition. Here at this time, the sub damper 38 fully opens the non heating flow path 40.

Furthermore, when the air mix damper 37 fully opens the heating flow path 39, and together with the sub damper 38 fully closes the non heating flow path 40, the full amount of the introduced air passes through the heater core 32 and is heated, and warm wind is blown into the vehicle interior from the air outlets where the dampers are in the open condition.

Moreover, when the air mix damper 37 is in the central position, the cold wind which does not pass through the heater core 32, and the warm wind which has passed through the heater core 32 are mixed at an air mix region AM. Then, depending on the operating mode, the conditioned air which has been regulated to a desired temperature is blown toward the vehicle interior from the air outlets where the dampers are in the open condition.

Here a description is given of the operation of the "defroster blowing mode" being the characteristic operating mode of the present invention. With this operating mode, the defroster function is improved by blowing toward the windscreen FG, high temperature warm wind at a low humidity. However, from the view point of air conditioning feeling, it is preferable to supply a cold wind to the head of the passenger. Therefore, the introduced air is dehumidified by the evaporator 31, and the openings of the air mix damper 37 and the sub damper 38 are controlled so as to adjust the amount of introduced air which is heated by passing through the heater core 32. On the other hand, the non heating flow path 40 takes the remainder of the introduced air and supplies this to the air mix region AM as cold wind.

At the air mix region AM, the warm wind heated by the heater core 32 and guided toward a baffle wall W provided on the upper face, and the cold wind flowing in from the non heating flow path 40 impinge on each other and are mixed.

Of these, the cold wind flowing along the wall face of the unit case 33 does not rise significantly in temperature and flows into the cold wind duct 41c as relatively low temperature cold wind. Moreover, the high temperature warm wind flowing along the baffle wall W is not very mixed with the cold wind, and flows into the warm wind duct 41h in a relatively unchanged high temperature condition. Here, the damper body of the rotatably supported damper 34a forms a dividing wall face between the cold wind duct 41c and the warm wind duct 41h. Therefore, the cold wind and warm wind can be separated at an early stage and introduced to the defroster air outlet 34.

As a result, the relatively high temperature warm wind from the warm wind outlet 34h is blown toward the inner face of the windscreen FG. Moreover, the relatively low temperature cold wind from the cold wind outlet 34c is blown out forming a two-layer flow with the warm wind. Consequently, the windscreen FG can receive a sufficient defroster function from the high temperature warm wind. Moreover, the warm wind rising up along the windscreen FG gradually mixes with the cold wind which flows as a two-layer flow in the space between the windscreen FG and the passengers. This results in air-conditioned air with a good feel, that is to say conditioned air which is not too hot, being supplied to the passengers.

Next is a description of a second embodiment shown in FIG. 2, having a different construction for the air regulating section unit 30. The second embodiment is characterized with a construction whereby the air conditioning unit 1 can be made smaller, in particular the vertical dimensions of the air regulating section unit 30 can be made smaller, while maintaining air conditioning capacity such as air flow quantity and temperature control.

Hereunder is a description of the components related to the second embodiment which are different to those of the first embodiment. This air regulating section unit 30 comprises a cold wind path 43 for guiding cold wind directly to the foot air outlet 36 from the upper face of the evaporator 31, and a warm wind path 44 for guiding warm wind directly to the defroster air outlet 34 and the face air outlet 35 from the upper face of the heater core 32. By eliminating the baffle wall W in the first embodiment, the air mix region AM is provided above the heater core 32. Here, this air mix region AM approximately overlaps the warm wind path 44.

In a side wall 33a of the unit case 33 there is provided a duct which becomes the cold wind path 43 for guiding the cold wind directly to the foot air outlet 36 from the upper face of the evaporator 31 for the non heating flow path 40. This cold wind path 43 is a duct having a closed section provided by integral molding with the unit case 33 which is a resin molded product. In the example in the figure, two are provided along the both side walls 33a. Here the outlet of the cold wind path 43 is provided so as to be fully closed by the foot damper 36a at the time of face mode, that is to say, when the foot air outlet 36 is fully closed.

Furthermore, at the upper central face of the heater core 32 sandwiched by the cold wind paths 43 provided on the both side walls 33a, there is provided a warm wind path 44 which guides warm wind directly to the defroster air outlet 34 and the face air outlet 35 from the upper face of the heater core 32. That is to say, by eliminating the baffle wall W (refer to FIG. 1) which impedes the formation of the warm wind path 44, the warm wind path 44 also functions as an air mix region AM for mixing the cold wind and warm wind to regulate the temperature.

With the air regulating section unit 30 constructed in this way, by opening the rotatably supported damper 34a in the defroster blowing mode, a warm wind path 44 for guiding warm wind directly from the heater core 32 as far as the warm wind duct 41h located approximately directly above, and a path for approximately directly guiding cold wind from the non heating flow path 40 as far as the cold wind duct 41c are formed. Therefore, the warm air and the cold air respectively flow into the warm wind duct 41h and the cold wind duct 41c without any significant mixing. At this time, the damper body of the rotatably supported damper 34a enters inside the air mix region AM, and as well as preventing mixing of the warm wind and cold wind, acts to smoothly guide these flows respectively to the warm wind duct 41h and the cold wind duct 41c. Here in FIG. 2b, as with FIG. 1, the black arrow shows warm wind while the white arrow shows cold wind, and the symbol HW denotes the warm wind (hot wind) layer, while CW denotes the cold wind layer.

As a result, from a comparison with the first embodiment, a more clearly defined temperature difference can be given to the warm wind guided by the warm wind duct 41h and the cold wind guided by the cold wind duct 41c. By respectively blowing these flows toward the inner face of the windscreen FG from the warm wind outlet 34h and the cold wind outlet 34c of the defroster air outlet 34, then a two-layer flow of conditioned air having more clearly defined temperature difference is formed.

Consequently, a higher temperature warm wind is blown onto the windscreen FG, enabling an increase in the defroster performance. Moreover, between the windscreen FG and the passengers, a lower temperature cold wind flowing out and forming a second layer, is able to mix with the high temperature warm wind flowing from the windscreen FG. Therefore, conditioned air which has been adjusted to air-conditioned air with an appropriate air conditioning feeling can be supplied to the passengers.

With the above described embodiments, two-layer flow conditioned air is blown onto the windscreen FG. However, this can be applied to blowing the two-layer flow onto other glass face as a defroster. For example, it is possible to apply to blowing the two-layer flow onto the door glass as its defroster for enabling checking of a door mirror.

With the air conditioning unit and vehicular air conditioner of the present invention, the following effects are obtained.

(1) Since a two-layer flow comprising a warm wind and a cold wind is blown out from the defroster outlet, if the high temperature warm wind is blown to the glass face, the defroster function can be improved.

(2) By making a two-layer flow with the warm wind flowing on the glass face side and the cold wind flowing on the vehicle interior side, then the cold wind is added to the warm wind which has completed the defroster function and mixed in the vehicle interior. Hence, conditioned air which has been adjusted to a suitable temperature and with an excellent air conditioning feeling (not too hot) can be supplied to the occupants.

(3) If an arrangement is adopted where a cold wind path for guiding cold wind from the upper face of the evaporator directly to the foot outlet, and a warm wind path for directly guiding warm wind from the upper face of the heater core to the defroster outlet and the face outlet are provided in the air conditioning unit, then a well defined temperature difference can be provided between the warm wind and the cold wind constituting the two-layer flow. Moreover, this is effective in miniaturizing the air conditioning unit.

(4) With the adoption of the divider and the rotatably supported damper dividing the defroster outlet into front and rear, the introduced warm wind and cold wind can be blown out as a two-layer flow. In particular, the damper body of the rotatably supported damper prevents the mixing of the introduced warm wind and cold wind, with the effect of maintaining the temperature difference.

In the above, the embodiments of the present invention have been described in detail with reference to the figures. However, the specific configurations are not limited to these embodiments, and any design changes and the like which do not depart from the gist of the present invention are to be included in the present invention.

What is claimed is:

1. An air conditioning unit comprising:
   an inside air/outside air box incorporating an inside air/outside air switching damper for opening an outside air inlet and an inside air inlet to selectively switch introduced air to one of inside air and outside air;
   a blower unit provided with a blower fan for drawing in said introduced air and blowing the introduced air to a downstream side; and
   an air regulating section unit with an evaporator for exchanging heat between said introduced air passing through said evaporator and a refrigerant, a heater core for exchanging heat between said introduced air passing through said heater core and warm water, and an air mix damper for adjusting a flow quantity of said introduced air which passes through said heater core, provided inside a unit case having a defroster air outlet and provided with a defroster damper, and with said heater core arranged above said evaporator,
   wherein said defroster damper is configured to define a warm air outlet and a cold air outlet within said defroster air outlet when said defroster damper is in an open position.

2. An air conditioning unit according to claim 1, wherein said air regulating section unit comprises a cold wind path for guiding cold wind directly from an upper face of said evaporator to a foot outlet, and a warm wind path for guiding warm wind directly from an upper face of said heater core to a defroster air outlet and a face air outlet.

3. An air conditioning unit according to claim 1, wherein said two-layer flow comprises warm wind on a glass face side and cold wind on a vehicle interior side.

4. An air conditioning unit according to claim 1, wherein said defroster air outlet is provided in an outlet of a duct connected to said air regulating section unit, and an interior of said duct is divided into front and rear by a divider which extends in a vehicle widthwise direction to form a warm wind outlet and a cold wind outlet.

5. An air conditioning unit according to claim 4, wherein said defroster damper is rotatably supported to said defroster air outlet, and wherein a damper body of said defroster damper has an open position that divides an interior of said duct into front and rear ducts.

6. An air conditioning unit according to claim 1, wherein said defroster damper is rotatably supported to said defroster air outlet, and wherein a damper body of said defroster damper has an open position that divides an interior of a duct having said defroster air outlet into front and rear ducts.

7. A vehicular air conditioner comprising:
   an air conditioning unit comprising: an inside air/outside air box incorporating an inside air/outside air switching damper for opening an outside air inlet and an inside air inlet to selectively switch introduced air to one of inside air and outside air; a blower unit provided with a blower fan for drawing in said introduced air and blowing the introduced air to a downstream side; and
   an air regulating section unit with an evaporator for exchanging heat between said introduced air passing through said evaporator and a refrigerant, a heater core for exchanging heat between said introduced air passing through said heater core and warm water, and an air mix damper for adjusting a flow quantity of said introduced air which passes through said heater core, provided inside a unit case having a defroster air outlet and provided with a defroster damper, and with said heater core arranged above said evaporator, wherein said defroster damper is configured to define a warm air outlet and a cold air outlet within said defroster air outlet when said defroster damper is in an open position;
   a refrigerant system comprising a compressor for compressing a gas refrigerant, a condenser for exchanging heat of the high pressure gas refrigerant with outside air to condense the gas refrigerant to liquid refrigerant, and an expansion valve for changing the high temperature and high pressure liquid refrigerant into a low temperature and low pressure liquid refrigerant, for supplying low temperature and low pressure liquid refrigerant to said evaporator;
   a heat source system for introducing engine cooling water to said heater core; and
   a control section for controlling operation of said air conditioning unit, said refrigerant system, and said heat source system.

8. An air conditioning unit comprising:
   an inside air/outside air box incorporating an inside air/outside air switching damper for opening an outside air inlet and an inside air inlet to selectively switch introduced air to one of inside air and outside air;
   a blower unit provided with a blower fan for drawing in said introduced air and blowing the introduced air to a downstream side; and
   an air regulating section unit with an evaporator for exchanging heat between said introduced air passing through said evaporator and a refrigerant, a heater core for exchanging heat between said introduced air passing through said heater core and warm water, and an air mix damper for adjusting a flow quantity of said introduced air which passes through said heater core, provided inside a unit case having a defroster air outlet,
   wherein said air regulating section unit includes means for discharging from said defroster air outlet a two-layer flow of air-conditioned air comprising a warm wind and a cold wind.

9. A vehicle comprising:
   a body having a glass face; and
   an air conditioning unit comprising:
      an inside air/outside air box incorporating an inside air/outside air switching damper for opening an outside air inlet and an inside air inlet to selectively switch introduced air to one of inside air and outside air;
      a blower unit provided with a blower fan for drawing in said introduced air and blowing the introduced air to a downstream side; and
      an air regulating section unit with an evaporator for exchanging heat between said introduced air passing through said evaporator and a refrigerant, a heater core for exchanging heat between said introduced air passing through said heater core and warm water, and an air mix damper for adjusting a flow quantity of said introduced air which passes through said heater core, provided inside a unit case having a defroster air outlet, wherein said air regulating section unit includes means for discharging from said defroster air outlet toward said glass face a two-layer flow of air-conditioned air comprising a warm wind and a cold wind.

10. An air conditioning unit comprising:

a box having an intake switching damper for selectively opening an outside air inlet and an inside air inlet to receive introduced air;

a blower unit configured to draw in the introduced air and blow the introduced air to a downstream side; and an air regulating unit having a unit case with an evaporator configured to exchange heat between the introduced air passing through said evaporator and a refrigerant, a heater core configured to exchange heat between the introduced air passing through said heater core and a warm fluid, and an air mix damper configured to adjust a flow quantity of the introduced air that passes through said heater core, said unit case having a defroster air outlet and a defroster damper configured to define a warm air outlet and a cold air outlet within said defroster air outlet when said defroster damper is in an open position, said defroster damper substantially defining a heat path from said heater core to said warm air outlet and a cold path from said evaporator to said cold air outlet when in the open position.

* * * * *